No. 695,527. Patented Mar. 18, 1902.
E. D. BARTLETT.
PHOTOGRAPHIC CAMERA.
(Application filed Nov. 14, 1901.)

(No Model.) 3 Sheets—Sheet 1.

WITNESSES
Albert V. Teale.
Leonard E. Haynes.

INVENTOR
Edwin Drew Bartlett
per Hubert Lefton Jones
Attorney

No. 695,527. Patented Mar. 18, 1902.
E. D. BARTLETT.
PHOTOGRAPHIC CAMERA.
(Application filed Nov. 14, 1901.)
(No Model.) 3 Sheets—Sheet 2.
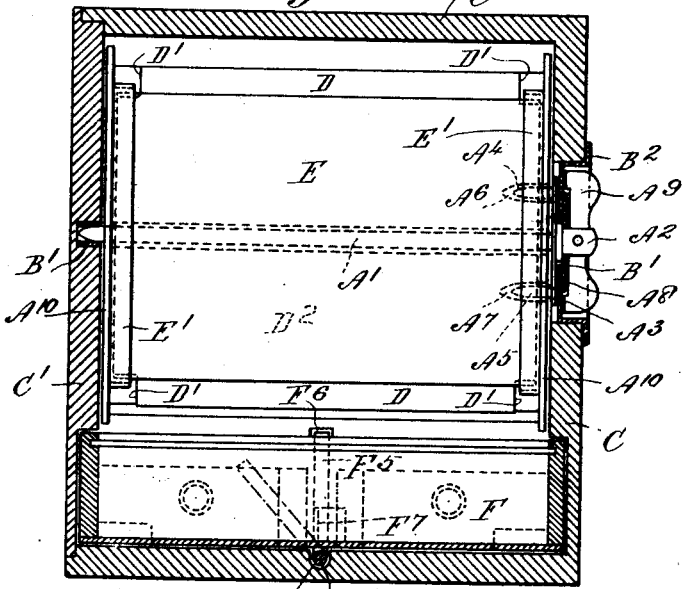
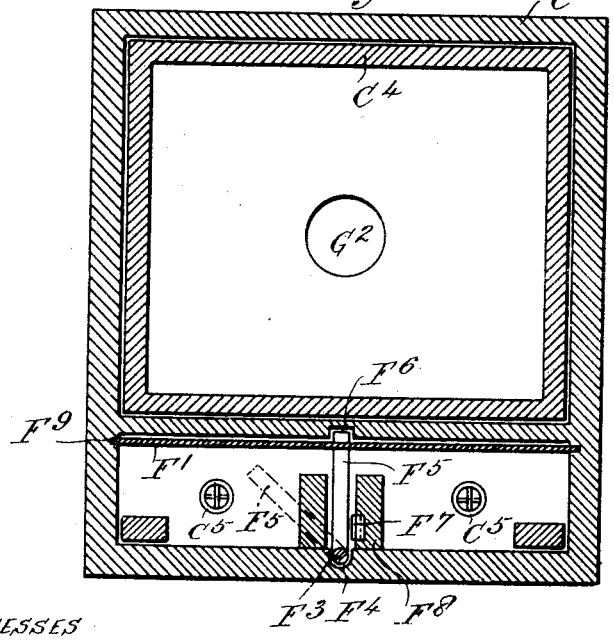
WITNESSES
Albert V. Teale
Leonard E. Haynes
INVENTOR
Edwin Drew Bartlett
per Herbert Sefton Jones
Attorney No. 695,527. Patented Mar. 18, 1902.
E. D. BARTLETT.
PHOTOGRAPHIC CAMERA.
(Application filed Nov. 14, 1901.)

(No Model.) 3 Sheets—Sheet 3.

WITNESSES
Albert V. Teale
Leonard E. Haynes

INVENTOR
Edwin Drew Bartlett
per Herbert Sefton Jones
Attorney.

UNITED STATES PATENT OFFICE.

EDWIN DREW BARTLETT, OF SOUTH TOTTENHAM, ENGLAND.

PHOTOGRAPHIC CAMERA.

SPECIFICATION forming part of Letters Patent No. 695,527, dated March 18, 1902.

Original application filed April 22, 1901, Serial No. 56,963. Divided and this application filed November 14, 1901. Serial No. 82,259. (No model.)

*To all whom it may concern:*

Be it known that I, EDWIN DREW BARTLETT, a subject of the King of Great Britain, residing at 84 Tynemouth road, South Tottenham, in the county of Middlesex, England, have invented new and useful Improvements in Photographic Cameras, of which the following is a specification.

This invention relates to improvements in photographic cameras, and is especially intended for use with the improved magazine film-holder described in my United States application, Serial No. 56,963, filed April 22, 1901.

According to one part of this invention provision is made for securing the correct focus for all the films upon the magazine-holder, said provision being rendered necessary for accurate work owing to the varying distances of the films from the lens.

In order to enable the invention to be readily understood, reference is made to the accompanying drawings, in which—

Figure 1:
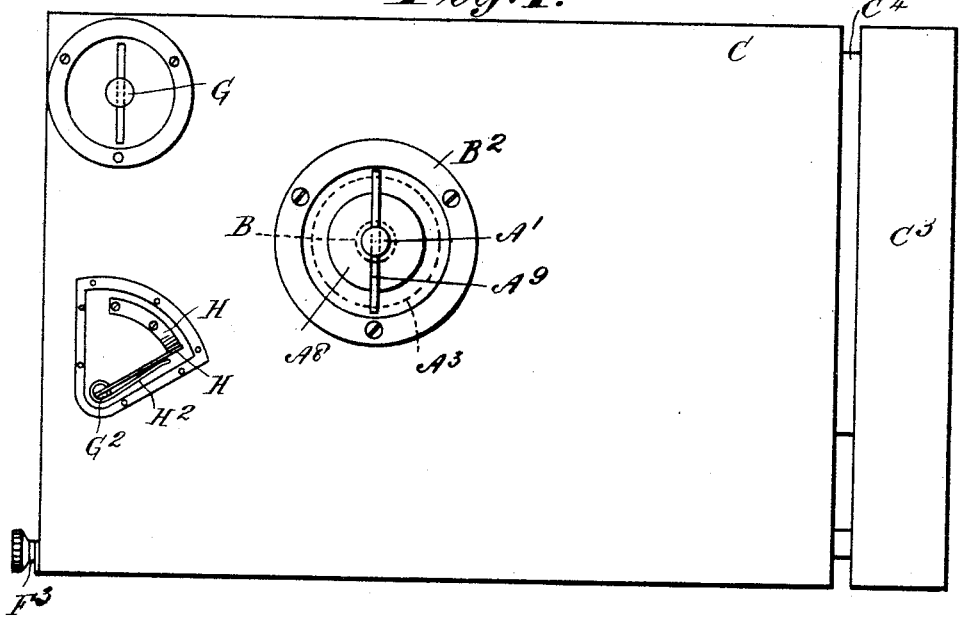
Figure 2:
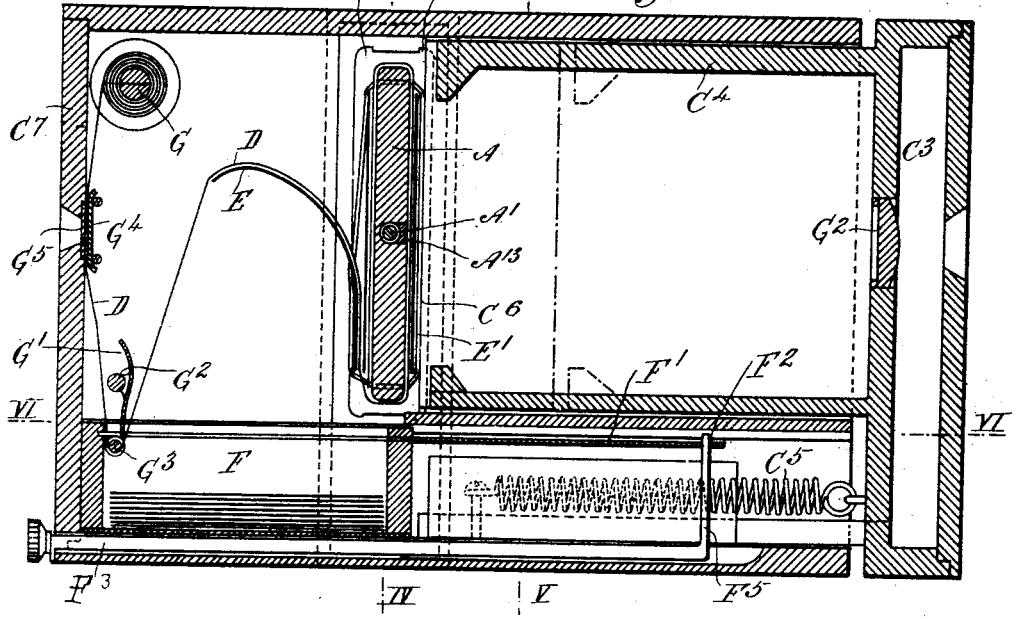
Figure 5:
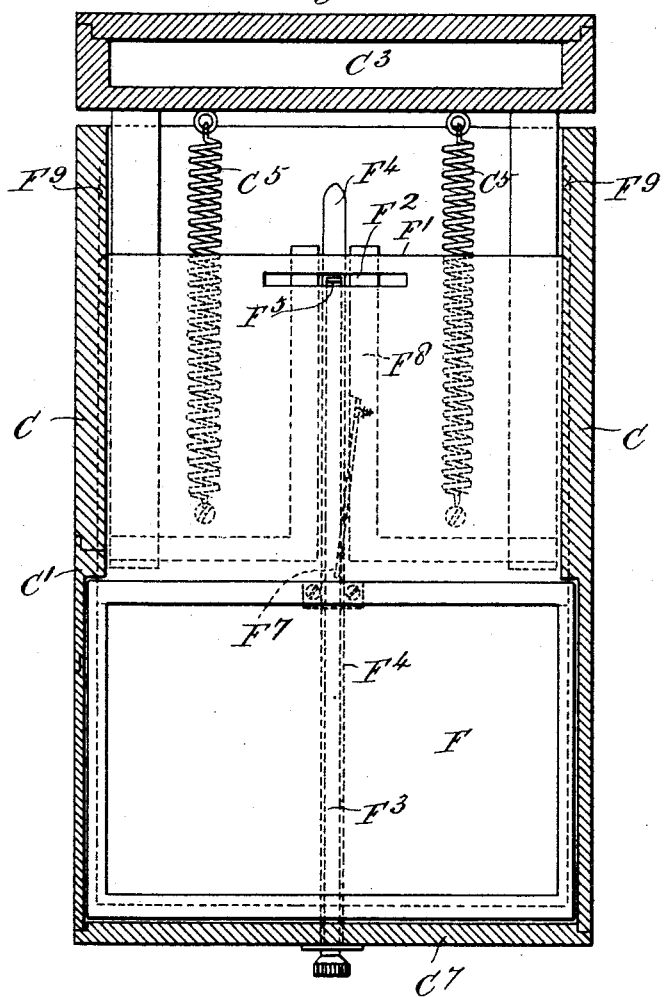

Figure 1 is a side elevation of a camera constructed with the said improvements. Fig. 2 is a central longitudinal section of the said camera. Fig. 3 is a cross-section upon the line III III, Fig. 3, looking toward the lens and showing the spool in elevation. Fig. 4 is a similar view upon the line IV IV, Fig. 3, looking toward the lens. Fig. 5 is a horizontal section upon the line V V, Fig. 3.

Similar letters of reference indicate similar or corresponding parts throughout the drawings.

The flat spool A is provided with a central slot or aperture $A^{14}$, Fig. 2, for mounting it upon a spindle in the camera. The slot or aperture is preferably constructed by deeply channeling the spool upon one of its faces and closing the channel by a strip $A^{13}$, having a concave under surface. The flanges of the spool are provided with holes corresponding to the slot or aperture so formed. The flanges and spool are also provided with means, such as recesses $A^6$ $A^7$, to enable the spool to be engaged with a turning mechanism in the camera.

The spool A is mounted in the camera upon a spindle $A'$, which has a bearing B B' at each side of the camera C. The bearing B consists of a dished plate $B^2$, which is let into the side of the camera and may be secured by screws thereto. A boss or journal $A^2$, formed on the spindle $A'$, runs in the central hole of the plate $B^2$, and upon the said boss is fixed or formed integral therewith a disk or flange $A^3$, having upon one face inwardly-projecting pins $A^4$ $A^5$ for engaging with the recesses $A^6$ $A^7$ in the end of the spool A. The other face of the disk or flange $A^3$ bears against the plate $B^2$ and serves to give support to the spindle, the latter being further secured and supported by means of a washer $A^8$, forced tightly onto the end of the spindle $A'$, so as to bear against the opposite side of the dished plate $B^2$. A thumb-plate or equivalent device $A^9$ may be keyed to the end of the spindle for the purpose of turning the same, and by the engagement of the pins $A^4$ $A^5$ with the recesses $A^6$ $A^7$ in the spool the turning of the latter is effected. The bearing B' is formed in a narrow door C' in the side of the camera. This door is removable to permit of the insertion of the spool into the camera, as hereinafter described.

As will be seen by reference to Fig. 2, the outside films are nearer to the lens $G^2$ of the camera C than those lying near to the spool A, and the following means are provided for securing for all the films the same focus: The front part $C^3$ of the camera C is made movable, and a square tube $C^4$, equal in length to the correct distance to be maintained between lens and film, is fixed to the front portion $C^3$ and can slide in suitable guides within the camera. Springs $C^5$, connected to the stationary and movable portions of the camera, maintain the end $C^6$ of the tube always in close contact with the elastic bands $E'$, which lie directly upon the edges of the film to be exposed. The tube $C^4$ and front portion $C^3$ are moved outward against the action of the springs $C^5$ by the rotation of the spool, the top edges of the spool A camming against the end $C^6$ of the tube. The springs return the tube tightly against the bands lying over the edges of the film upon the opposite face of the spool which is next brought opposite the lens. The focus will therefore be always the same for any film exposed. The films are delivered into a drawer or magazine F, provided in the bottom of the camera, which may be closed by a sliding lid F' in the following manner: A slot F² is formed in the edge of the lid, which overhangs the end of the drawer when the lid is shut. A rod F³, adapted to slide in a guide-slot F⁴ in the base of the camera, is provided at one end with an arm F⁵ at right angles to it. In its vertical position the end of the arm F⁵ enters the slot F², so that by sliding the rod F³ in or out the lid may be moved to uncover or cover the drawer F. A guide-slot F⁶ for the end of the arm F⁵ is formed in the roof of the lower compartment of the camera. Guide-slots F⁹ are also provided for the lid in the sides of the camera C. A blade-spring F⁷, fixed at one end to a block F⁸, projects into the path of the arm F⁵, so that the latter when drawn back is pressed over by the spring and turns about the axis of the rod F³, as shown in dotted lines, Figs. 3 and 4, and passes out of engagement with the guide-slot F² in the lid F', thereby leaving the drawer free to be withdrawn from the camera. By this construction it will be seen that the rod F³ must first be pulled out to cover the drawer before it is possible to remove either the drawer or the back of the camera, and the possibility of removing the drawer in an uncovered condition is thus guarded against. According to Fig. 2 the band has its end attached to a roller G, which may be turned to roll up the band to effect the release of a film. A guide-plate G' is supported upon arms G², pivoted to the sides of the camera, a guide-roller G³ being mounted in lugs formed upon the guide-plate G'. The binding and releasing band or strip passes around the roller G³ and upward to the roller G, and on its way is caused by a second guide-plate G⁴ to pass close to an observation-aperture G⁵, through which marks or figures upon the band or strip, indicating the number of the film released, will be seen. The guide-plate G' serves to guide the film in falling into the drawer or magazine. The guide-plate G⁴ may be hinged at one end to the side of the camera, the other end resting against a suitable stop. The guide-plate G' may be turned about its pivot to be free of the magazine-lid when it is desired to withdraw the latter, and the guide-plate G⁴ may be turned upon its hinge in order to give free access to the interior of the camera when the removable back C⁷ is taken away.

The operation is as follows: A magazine-holder loaded in the manner described in the said application, Serial No. 56,963, is inserted through the opening in the side of the camera, the hole in the spool passing over the spindle A' and the recesses A⁶ A⁷ engaging with the pins A⁴ A⁵. The front portion C³ and tube C⁴ are held meanwhile in a forward position until the spool has been secured in place by the replacing of the door C', which carries the other bearing B' for the spindle, after which the front C³ is released, and the end C⁶ of the tube C⁹ will recede and butt against the elastic bands E' upon the spool. The end of the binding and releasing band D is then taken hold of from the back of the camera, the end C⁷ being removed, and is led around the roller G³ upward past the guide-plate G⁴ and secured to the roller G. The back C⁷ of the camera is then secured in place, thereby pressing the binding and releasing band D at the aperture G⁵ against the guide-plate G⁴. Supposing now there is a film opposite the lens, an exposure is made, and the spool A is given a half-revolution. In the first ninety degrees of movement the top edge of the spool, Fig. 2, bears against the sides of the end C⁶ of the tube C⁴, forcing the latter outward; and during the second ninety degrees of movement the springs return the tube C⁴, so that the end bears against the elastic bands lying upon the edges of the unexposed film on the other side of the spool, which has now been brought opposite the lens. The roller G is now rotated to wind up the band D, thereby gradually releasing the edges of the latter from the retaining-elastic bands E' and also the edges of the exposed film E, which is outside the band, as shown most clearly in Fig. 2. The winding of the roller G is stopped when a number appears opposite the observation-aperture G⁵. This takes place when the band is in its taut position. (Shown in broken line, Fig. 2.) Other means for indicating the number or position of the films may be employed. The operations having been repeated for the whole of the films, a spring H inside the camera is pressed down, thereby releasing a lever H', which is operated by a spring H², Fig. 1. The movement of the lever H' about its pivot serves to turn the arm G² about the same pivot, and so lift the guide device G³ clear of the lid F' of the magazine. The said lid may then be closed by pulling out the rod F³, the spring F⁷ operating to free the arm F⁵ from the slot F² in said lid. The back C⁷ of the camera is then removed and the drawer or magazine may be withdrawn. If the zigzag method described in the said application of packing the spool be employed, then the magazine may be designed to lie in front of the spool and the band may be operated to release the films by winding onto a roller, which may also be situated in front of the spool. In this case it will be obvious that the spool need not be turned.

Although means are shown for rotating the spool by hand separately, it is to be understood that by constructing the binding and releasing band of material of suitable strength the spool might be rotated and the films released and delivered to the magazine merely by winding up the band upon the roller G. Also the roller G might be driven by a spring-motor, which could automatically wind up the binding and releasing band whenever the spool rotated.

Instead of employing a roller G for receiving the unwound band or strip the latter might be passed through a light-tight slot in the back of the camera. In this case the binding and releasing band could be pulled by hand, and upon a number emerging from the light-tight slot, indicating that a film had been released and deposited, the portion of the band last drawn out could be simply torn off.

If it should be desired to close the lid of the magazine for any considerable time while the magazine is in the camera, the rod $F^3$, which would be in the way when drawn out to close the lid, might be made in two portions hinged or coupled together, so as to permit of the rod being folded back against the camera.

When the band is received upon a winding-roller G, any unexposed films upon the spool may be effectually covered during the removal of the drawer by simply unwinding from G and winding a few turns back again onto the spool A.

What I claim as my invention, and desire to secure by Letters Patent, is—

1. In a photographic camera, the combination with a film-carrying spool, of a tube carrying the lens, means for moving the tube forward, and means for returning said tube to its normal position.

2. In a photographic camera the combination of a flat film-carrying spool, a reciprocating tube carrying the lens in operative engagement with the spool, and means for returning the tube after it has been cammed forward by the spool, substantially as set forth.

3. In a photographic camera the combination of a flat film-carrying spool, a reciprocating tube carrying the lens in operative engagement with the spool, and springs connected to the tube and to the body of the camera, substantially as and for the purpose set forth.

4. In a photographic camera the combination of a flat film-carrying spool, a reciprocating tube carrying the lens in operative engagement with the spool, a film binding and releasing band around the spool, means for operating the band, and means for reciprocating the tube, substantially as set forth.

5. In a photographic camera the combination of a flat film-carrying spool provided with flexible retaining devices, a film binding and releasing band upon the spool, a reciprocating tube carrying the lens, means for retaining the end of the tube in contact with the flexible devices upon the spool, and means for reciprocating the tube, substantially as and for the purpose set forth.

6. In a photographic camera the combination of a flat film-carrying spool, a film binding and releasing band upon the spool, means for operating the band, flexible edge-retaining devices for the band and films, a reciprocating tube carrying the lens, said tube being normally in contact with the edge-retainers for the purpose described, and means for operating the tube, substantially as set forth.

7. In a photographic camera the combination of a flat film-carrying spool, means for operating the spool, a binding and releasing band upon the spool, a roller for guiding the band and a winding-roller for operating the band, flexible edge-retaining devices for the band and films, a reciprocating tube carrying the lens, said tube being normally in contact with the edge-retainers for the purpose described, and means for operating the tube, substantially as set forth.

8. In a photographic camera the combination of a flat film-carrying spool, means for operating the spool, a binding and releasing band upon the spool, a roller for guiding the band and a plate for guiding the films, a winding-roller for operating the band, flexible edge-retaining devices for the band and films, a reciprocating tube carrying the lens, said tube being normally in contact with the edge-retainers for the purpose described, and means for operating the tube, substantially as set forth.

9. In a photographic camera the combination of a flat film-carrying spool, means for operating the spool, a binding and releasing band upon the spool, a roller for guiding the band and a plate for guiding the films, a winding-roller for operating the band, flexible edge-retaining devices for the band and films, a reciprocating tube carrying the lens, said tube being normally in contact with the edge-retainers for the purpose described, means for operating the tube, a receptacle beneath the guide-plate for the films, a slotted cover for the receptacle, and means for engaging and automatically disengaging an arm with said slot for operating the cover, substantially as set forth.

EDWIN DREW BARTLETT.

Witnesses:
LEONARD E. HAYNES,
ALBERT V. TEALE.